United States Patent

Madrahalli et al.

(10) Patent No.: US 8,929,735 B2
(45) Date of Patent: Jan. 6, 2015

(54) DYNAMIC TRAIL TERMINATION POINT CREATION FOR OPTICAL TRANSPORT NETWORKS

(75) Inventors: Vagish Madrahalli, Woodstock, GA (US); Satish Gopalakrishan, Alpharetta, GA (US); Richard Conklin, Cumming, GA (US); Gustav K. Larsson, Sunnyvale, CA (US)

(73) Assignee: Ciena Corporation, Hanover, MD (US)

(*) Notice: Subject to any disclaimer, the term of this patent is extended or adjusted under 35 U.S.C. 154(b) by 690 days.

(21) Appl. No.: 12/775,930

(22) Filed: May 7, 2010

(65) Prior Publication Data

US 2011/0274427 A1 Nov. 10, 2011

(51) Int. Cl.
| | |
|---|---|
| *H04J 14/08* | (2006.01) |
| *H04J 3/16* | (2006.01) |
| *H04J 3/14* | (2006.01) |
| *H04L 12/703* | (2013.01) |

(52) U.S. Cl.
CPC .............. *H04J 3/1652* (2013.01); *H04J 3/14* (2013.01); *H04L 45/28* (2013.01)
USPC .......................................................... 398/57

(58) Field of Classification Search
USPC .......................................................... 398/57
See application file for complete search history.

(56) References Cited

U.S. PATENT DOCUMENTS

| | | | | |
|---|---|---|---|---|
| 7,171,124 | B2* | 1/2007 | Smith et al. ...................... | 398/97 |
| 7,206,281 | B2 | 4/2007 | Chen et al. | |
| 7,212,495 | B2* | 5/2007 | Karri et a ...................... | 370/238 |
| 7,283,466 | B1 | 10/2007 | Chen et al. | |
| 7,733,870 | B1* | 6/2010 | Liu et al. ..................... | 370/395.2 |
| 7,734,176 | B2* | 6/2010 | Mishra et al. ................... | 398/47 |
| 2007/0211623 | A1* | 9/2007 | Nishioka ........................ | 370/218 |
| 2008/0044183 | A1* | 2/2008 | Perkins et al. .................. | 398/58 |
| 2009/0202240 | A1* | 8/2009 | Carroll et al. ................... | 398/45 |
| 2009/0208206 | A1* | 8/2009 | Madrahalli et al. ............. | 398/45 |
| 2010/0054265 | A1* | 3/2010 | Lv et al. ......................... | 370/400 |
| 2010/0054731 | A1* | 3/2010 | Oltman et al. .................... | 398/1 |

OTHER PUBLICATIONS

"A Tutorial on ITU-T G.709 Optical Transport Networks (OTN)", PMC-Sierra, Inc. 2009.*
"Multiservice Optical Switching System", Ciena, 2008.*
International Telecommunication Union; ITU-T Telecommunication Standardization Section of ITU, M.3100 (Apr. 2005); Series M: Telecommunication Management, Including TMN and Network Maintenance—Telecommunication Management Network, Generic Network Information Model; Geneva 2005.

* cited by examiner

*Primary Examiner* — Shi K Li
(74) *Attorney, Agent, or Firm* — Clements Bernard PLLC; Christopher L. Bernard; Lawrence A. Baratta, Jr.

(57) ABSTRACT

The present disclosure provides dynamic service provisioning by creating embedded Optical Transport Network (OTN) ports on the fly during mesh restoration or circuit provisioning. These dynamically provisioned ports are referred to herein as "fast paths" with all the management objects created in a "slow path" so that they do not interfere with mesh restoration performance. During network failures, these dynamically created objects are deleted via the "slow path" and a new mesh path supports "fast path" creation of these objects. This results in substantial increase in mesh performance and also provides enhancements for operators allowing a "Click and Go" model to provision circuits across a network. This also reduces routing scaling issue as the routing itself is against the OTU level and not against the embedded lines.

18 Claims, 7 Drawing Sheets

DYNAMIC TRAIL TERMINATION POINT CREATION FOR OPTICAL TRANSPORT NETWORKS

FIELD OF THE INVENTION

The present invention relates generally to optical communication networks. More particularly, the present invention relates to systems and methods for dynamic service provisioning in Optical Transport Networks (OTN) by creating embedded OTN ports on the fly during mesh restoration, circuit provisioning, etc. through dynamic trail termination points (TTPs).

BACKGROUND OF THE INVENTION

Conventionally, mesh restoration, service provisioning, etc. in optical networks is on a fixed port basis with no dynamic adaptation. Here, timeslots associated with a port are fixed and cross connects are created dynamically during mesh restoration to bind to those timeslots. With the arrival of Optical Transport Network (OTN) ports, the same port may carry different traffic and also may support different payloads from a user's service point of view. This makes mesh restoration cumbersome as the user has to statically create the underneath service supporting embedded lines and then allow mesh restoration to use these static ports. Thus, the user has to break the OTN network into different service based subgroups to support service applications. There is no dynamic provisioning support to create an OTN overlay based on availability of the physical ports.

BRIEF SUMMARY OF THE INVENTION

In various exemplary embodiments, the present invention provides dynamic service provisioning by creating embedded OTN ports on the fly during mesh restoration. These dynamically provisioned ports are referred to herein as "fast paths" with all the management objects created in a "slow path" so that they do not interfere with mesh restoration performance. The fast path may support the following trail termination points (TTPs)—Optical channel Data Unit 3 (ODU3), Optical channel Data Unit 2 (ODU2), and Optical channel Data Unit 1 (ODU1). These trail termination points may be used for supporting different service models such as ODU3, ODU2, ODU1 and ODU0/Optical channel Payload Virtual Containers (OPVCs) Connections. During network failures, these dynamically created objects are deleted via the "slow path" and a new mesh path supports "fast path" creation of these objects. This results in substantial increase in mesh performance and also provides enhancements for operators allowing a "Click and Go" model to provision circuits across a network. This also reduces routing scaling issue as the routing itself is against the OTU level and not against the embedded lines. Thus, the present invention provides end to end OTN connection provisioning; automatic embedded trail termination point Creation via "fast path" (during programming the switch core) based on service request (ODU1, ODU0/OPVC); provisioning via Manual or Automatic routes; a "slow path" Model for management object creation/deletion; and "slow path" Cross Connect Aggregation by binding Connection Termination Points (CTPs).

In an exemplary embodiment, an optical node includes a plurality of ports operating links according to Optical Transport Network (OTN); and a control module in communication with each of the plurality of ports, wherein the control module operates a signaling and routing protocol; wherein the control module is configured to dynamically manage OTN trail termination points. The OTN trail termination points include any of ODU3 trail termination points, ODU2 trail termination points, and ODU1 trail termination points, and wherein each of the OTN trail termination points support different service models including any of ODU2, ODU1 and ODU0/OPVC. The control module is configured to manage the OTN trail termination points via both a fast path and a slow path. The optical node further includes a control plane; a data/transport plane; and a state machine for each of the OTN trail termination points, wherein the state machine determines activity associated with the OTN trail termination points relative to the control plane and the data/transport plane. The state machine may include four states based upon each of the OTN trail termination points state in the control plane and the data/transport plane. The slow path is utilized with the control plane and the fast path is utilized with the data/transport plane. One of the four states includes a hold off timer to hold a time period prior to deleting a OTN trail termination point. Responsive to a network failure, a OTN trail termination point is dynamically created via the slow path in the control plane and via the fast path in the data/transport plane. The signaling and routing protocol includes one of Optical Signaling and Routing Protocol (OSRP), Automatically Switched Optical Network (ASON), and Generalized Multi Protocol Label Switching (GMPLS). Advertised bandwidth may include any of Optical Channel Data Unit n, where n=0, 1, 2, 3, and Optical channel Payload Virtual Containers. The signaling and routing protocol communicates to the other optical nodes via any of the General Communication Channels (GCC) in the OTN overhead including GCC0, GCC1, GCC2 or GCC1+2, an optical service channel, or an out-of-band connection.

In another exemplary embodiment, an optical method includes, via a bandwidth manager, maintaining bandwidth information at a various Optical Transport Network (OTN) levels; receiving a circuit request; and dynamically allocating various different levels of OTN trail termination points responsive to the circuit request. The optical method further includes setting up cross connections based on the dynamically created OTN trail termination points; allocating bandwidth; and returning the cross connects to a routing subsystem. The optical method further includes implementing a state machine to distinguish the OTN trail termination points between a control plane and a data/transport plane. The optical method further includes creating an OTN trail termination point via a fast path in the data/transport plane and via a slow path in the control plane; implementing a hold off timer prior to deleting the OTN trail termination point; and if no circuits are added to the OTN trail termination point prior to expiration of the hold off timer, deleting the OTN trail termination point via the slow path in both the data/transport plane and the control plane. The OTN trail termination points include any of ODU3 trail termination points, ODU2 trail termination points, and ODU1 trail termination points, and wherein each of the OTN trail termination points support different service models including any of ODU2, ODU1 and ODU0/OPVC.

In yet another exemplary embodiment, an optical network includes a plurality of interconnected nodes utilizing Optical Transport Network (OTN) links for the interconnection; and a signaling and routing protocol operating on the plurality of interconnected nodes over the OTN links for maintaining network topology and bandwidth and for establishing Sub Network Connections (SNCs) between any of the plurality of interconnected nodes; wherein each of the plurality of interconnected nodes is configured to dynamically manage OTN trail termination points, and wherein the OTN trail termination points includes any of ODU3 trail termination points, ODU2 trail termination points, and ODU1 trail termination points, and wherein each of the OTN trail termination points support different service models including any of ODU2, ODU1 and ODU0/OPVC. The optical network further includes one or more databases associated with the signaling and routing protocol for maintaining topology and bandwidth of the network; and path computation logic associated with the signaling and routing protocol to provide routes through the network based on the one or more databases. The optical network further includes a state machine operated at each of the plurality of interconnected nodes for each of the dynamically managed OTN trail termination points, wherein the state machine state machine distinguishes the OTN trail termination points between a control plane and a data/transport plane. Each of the plurality of interconnected nodes based upon the state machine is configured to create an OTN trail termination point via a fast path in the data/transport plane and via a slow path in the control plane; implement a hold off timer prior to deleting the OTN trail termination point; and if no circuits are added to the OTN trail termination point prior to expiration of the hold off timer, delete the OTN trail termination point via the slow path in both the data/transport plane and the control plane.

BRIEF DESCRIPTION OF THE DRAWINGS

The present invention is illustrated and described herein with reference to the various drawings of exemplary embodiments, in which like reference numbers denote like method steps and/or system components, respectively, and in which.

DETAILED DESCRIPTION OF THE INVENTION

In various exemplary embodiments, the present invention provides dynamic service provisioning by creating embedded OTN ports on the fly during mesh restoration, service provisioning, etc. These dynamically provisioned ports are referred to herein as "fast paths" with all the management objects created in a "slow path" so that they do not interfere with mesh restoration performance. The fast path may support the following trail termination points (TTPs)—Optical channel Data Unit 3 (ODU3), Optical channel Data Unit 2 (ODU2), and Optical channel Data Unit 1 (ODU1). These trail termination points may be used for supporting different service models such as ODU3, ODU2, ODU1 and ODU0/ Optical channel Payload Virtual Containers (OPVCs) Connections. During network failures, these dynamically created objects are deleted via the "slow path" and a new mesh path supports "fast path" creation of these objects. This results in substantial increase in mesh performance and also provides enhancements for operators allowing a "Click and Go" model to provision circuits across a network. This also reduces routing scaling issues as the routing itself is against the OTU level and not against the embedded lines. Thus, the present invention provides end to end OTN connection provisioning; automatic embedded trail termination point Creation via "fast path" (during programming the switch core) based on service request (ODU1, ODU0/OPVC); provisioning via manual or automatic routes; a "slow path" model for management object creation/deletion; and a "slow path" Cross Connect Aggregation by binding Connection Termination Points (CTPs).

Figure 1:
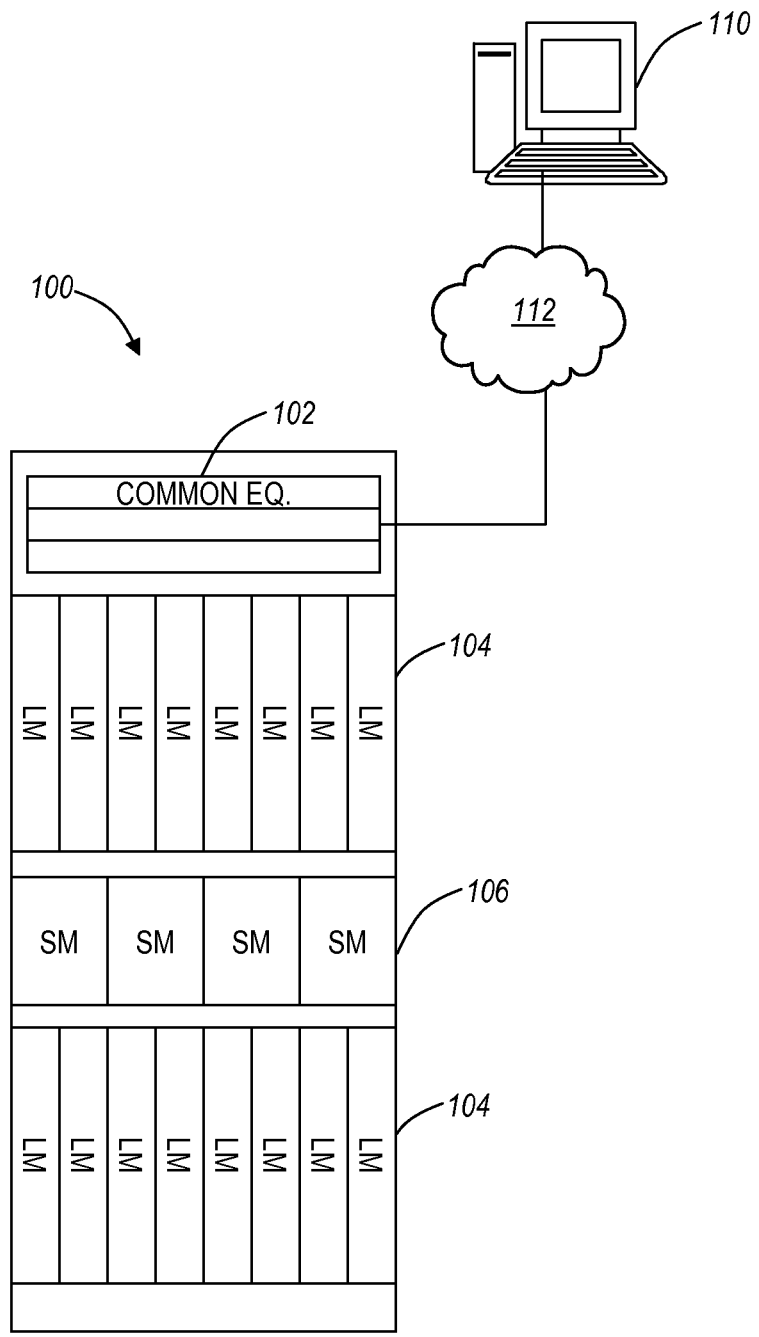
FIG. 1 is a block diagram of an optical switch supporting mesh restoration in an OTN layered network.

Referring to FIG. 1, in an exemplary embodiment, an optical switch 100 is illustrated supporting mesh restoration in an OTN layered network. The optical switch 100 is a network element (NE) that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing layer 0, 1, and 2 consolidation. Generally, the optical switch 100 includes common equipment 102, line modules (LM) 104, and switch modules (SM) 106. The common equipment 102 may include power, a control module, operations, administration, maintenance, and provisioning (OAM&P) access, and the like. For example, the common equipment 102 may connect to a management system 110 through a data communication network 112. The management system 110 may include a network management system (NMS), element management system (EMS), or the like. Note, the management system 110 may support "Click and Go" provisioning of services utilizing the systems and methods described herein for dynamic creation of trail termination points. Additionally, the common equipment 102 may include a control plane processor configured to operate the control plane and the systems and methods described herein with regard to OTN mesh restoration.

The line modules 104 may be communicatively coupled to the switch modules 106, such as through a backplane, midplane, or the like. The line modules 104 are configured to provide ingress and egress to the switch modules 106, and are configured to provide interfaces for the OTN services described herein. In an exemplary embodiment, the line modules 104 may form ingress and egress switches with the switch modules as center stage switches for a three-stage switch, e.g. three stage Clos switch. The line modules 104 may include optical transceivers, such as, for example, 2.5 Gb/s (OC-48/STM-1, OTU1, ODU1), 10 Gb/s (OC-192/ STM-64, OTU2, ODU2), 40 Gb/s (OC-768/STM-256, OTU3, ODU4), etc. Further, the line modules 104 may include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 104 may include DWDM interfaces, short reach interfaces, and the like, and may connect to other line modules 104 on remote optical switches 100, NEs, end clients, and the like. From a logical perspective, the line modules 104 provide ingress and egress ports to the optical switch 100, and each line module 104 may include one or more physical ports. Further, the switch 100 may include software and the like to track logical objects such as connection termination points, trail termination points, etc. associated with the line modules 104.

The switch modules 106 are configured to switch services between the line modules 104. For example, the switch modules 106 may provide wavelength granularity, SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2

(ODU2), Optical Channel Data Unit-3 (ODU3), Optical Channel Data Unit-4 (ODU4), Optical channel Payload Virtual Containers (OPVCs), etc.; Ethernet granularity; and the like. Specifically, the switch modules 106 may include both Time Division Multiplexed (TDM) and packet switching engines. The switch modules 106 may include redundancy as well, such as 1:1, 1:N, etc. In an exemplary embodiment of the present invention, the switch modules 106 are configured to provide OTN layer switching. Collectively, the line modules 104 and the switch modules 106 may provide OTN services with mesh restoration.

Figure 2:
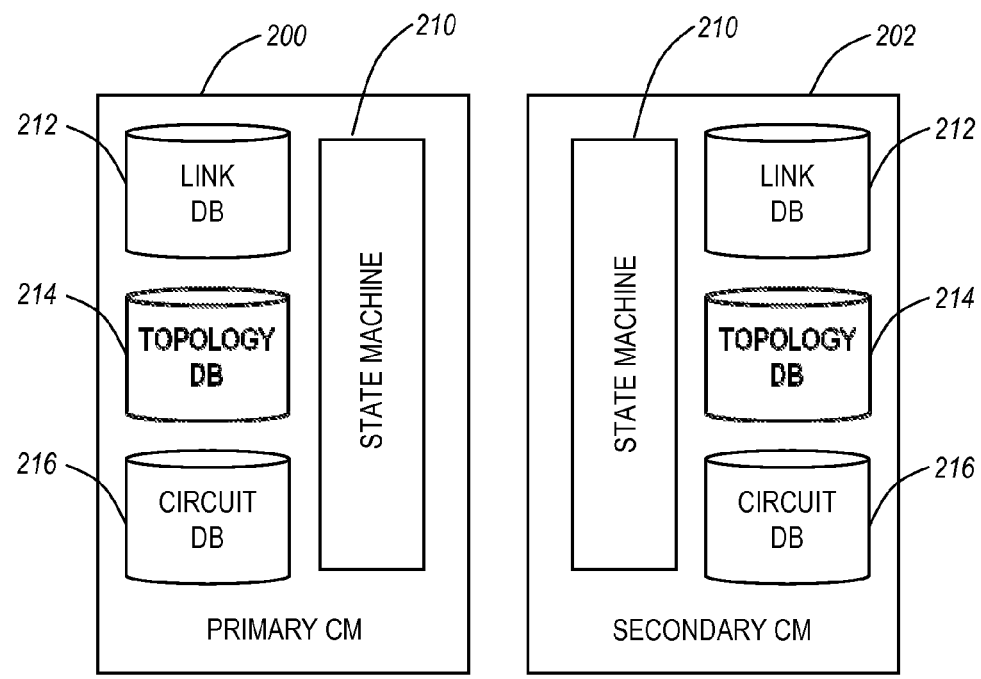
FIG. 2 is a block diagram of redundant control modules (CMs) for the optical switch of FIG. 1 to provide control plane processing to enable layered OTN mesh services.

Referring to FIG. 2, in an exemplary embodiment, redundant control modules (CMs) 200, 202 for the optical switch 100 are illustrated to provide control plane processing to enable layered OTN mesh services. For example, the control plane can include Optical Signaling and Routing Protocol (OSRP), Automatically Switched Optical Networks—ITU-T Recommendation G.8080: Architecture for the Automatically Switched Optical Network (ASON) 2001, Generalized Multi-Protocol Label Switching Architecture (G-MPLS) IETF RFC 3945, 2004, and the like. The CMs 200, 202 may be part of common equipment, such as common equipment 102 in the optical switch of FIG. 1. The CMs 200, 202 may include a processor which is hardware device for executing software instructions and associated memory. The processor may be any custom made or commercially available processor, a central processing unit (CPU), an auxiliary processor among several processors associated with the CMs 200, 202, a semiconductor-based microprocessor (in the form of a microchip or chip set), or generally any device for executing software instructions. When the CM 200, 202 is in operation, the processor is configured to execute software stored within memory, to communicate data to and from the memory, and to generally control operations of the CM 200, 202 pursuant to the software instructions.

The CMs 200, 202 may also include network interfaces, a data store, memory, and the like. The network interfaces may be used to enable the CMs 200, 202 to communicate on a network, such as to communicate control plane information to other CMs. The network interfaces may include, for example, an Ethernet card (e.g., 10BaseT, Fast Ethernet, Gigabit Ethernet) or a wireless local area network (WLAN) card (e.g., 802.11a/b/g). The network interfaces may include address, control, and/or data connections to enable appropriate communications on the network. The data store may be used to store data, such as control plane information received from NEs, other CMs, etc. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media. The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. Note that the memory may have a distributed architecture, where various components are situated remotely from one another, but may be accessed by the processor.

Each of the CMs 200, 202 include a state machine 210, a link database (DB) 212, a topology DB 214, and a circuit DB 216. The CMs 200, 202 are responsible for all control plane processing. For example, the control plane may include OSRP, ASON, G-MPLS, or the like. In describing the exemplary embodiments herein, reference may be made to OSRP paths, links, legs, and lines. OSRP is a distributed protocol designed for controlling a network of optical switches 100 or cross-connects (OXCs). OSRP introduces intelligence in the control plane of an optical transport system. It may perform many functions such as automatic resource discovery, distributing network resource information, establishing and restoring connections dynamically across the network, and the like. However, the present invention is not limited to OSRP. Those skilled in the art will recognize that other intelligent signaling and routing protocols that can (or can be modified to) provide similar functionality as OSRP (e.g., automatically establishing and restoring connections across the network, and the like) are within the scope of embodiments of the invention. For further background information, some of the routing and signal functions of OSRP are disclosed in commonly owned and co-pending U.S. Pat. No. 7,009,934, Mar. 7, 2006, entitled "METHOD AND APPARATUS FOR REROUTING AN OPTICAL NETWORK UPON FAULT", which is hereby fully incorporated herein by reference, and U.S. Pat. No. 6,859,431, Feb. 22, 2005, entitled "SYSTEM AND METHOD FOR CALCULATING PROTECTION ROUTES IN A NETWORK PRIOR TO FAILURE", which is hereby fully incorporated herein by reference.

The CMs 200, 202 may be configured in a redundant 1+1, 1:1, etc. configuration. The state machine 210 is configured to implement the behaviors described herein with regard to OTN mesh networking The DBs 212, 214, 216 may be stored in the memory and/or data store. The link DB 212 includes updated information related to each link in a network. The topology DB 214 includes updated information related to the network topology, and the circuit DB 216 includes a listing of terminating circuits and transiting circuits at an NE where the CMs 200, 202 are located. The CMs 200, 202 may utilize control plane mechanisms to maintain the DBs 212, 214, 216. For example, a HELLO protocol can be used to discover and verify neighboring ports, nodes, protection bundles, and the like. Also, the DBs 212, 214, 216 may share topology state messages to exchange information to maintain identical data. Collectively, the state machine 210 and the DBs 212, 214, 216 may be utilized to advertise topology information, capacity availability, create and manage trail termination points, and provide connection management (provisioning and restoration). For example, each link in a network may have various attributes associated with it such as, for example, line protection, available capacity, total capacity, administrative weight, protection bundle identification, delay, and the like. The state machine 210 and the DBs 212, 214, 216 may be configured to provide automated end-to-end provisioning. For example, a route for a connection may be computed from originating node to terminating node and optimized using Dijkstra's Algorithm, i.e. shortest path from source to a destination based on the least administrative cost or weight, subject to a set of user-defined constraints. As is described herein, the CMs 200, 202 may provide a routing subsystem through the state machine 210 and the DBs 212, 214, 216.

Further, the CMs 200, 202 are configured to communicate to other CMs 200, 202 in other nodes on the network. This communication may be either in-band or out-of-band. For SONET networks, the CMs 200, 202 may use standard or extended SONET line overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the present invention includes an in-band signaling mechanism utilizing OTN overhead. The General Communication Channels (GCC) defined by ITU-T Recommendation G.709 "Interfaces for the optical transport network (OTN)" G.709 are in-band side channel used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In the present invention, GCC0, GCC1, GCC2 or GCC1+2 may be used for in-band signaling or routing to carry control plane traffic. Based on the intermediate equipment's termination layer, different bytes may be used to carry control plane traffic. If the ODU layer has faults, it has been ensured not to disrupt the GCC1 and GCC2 overhead bytes and thus achieving the proper delivery control plane packets.

In various exemplary embodiments, the present invention provides dynamic service provisioning by creating embedded OTN ports on the fly during mesh restoration, circuit provisioning, and the like. In particular, routing capabilities for OTN lines through the optical switch 100 and the CMs 200, 202 may support different bandwidth granularity rates (ODU3, ODU2, ODU1, ODU0, OPVCs, etc.). Cross-connect (XCON) data sets may be managed by each NE such as through the CMs 200, 202. These data sets may be used to calculate, track, manage, restore, etc. lines through an optical network, e.g. see commonly assigned U.S. Pat. No. 7,206,281, "CALCULATING PHYSICAL ROUTES IN A COMMUNICATION NETWORK," and commonly assigned U.S. Pat. No. 7,283,466, "TRACKING PHYSICAL ROUTE CHANGES IN OPTICAL SWITCHING NETWORK," the contents of each are hereby fully incorporated herein by reference.

Figure 3:
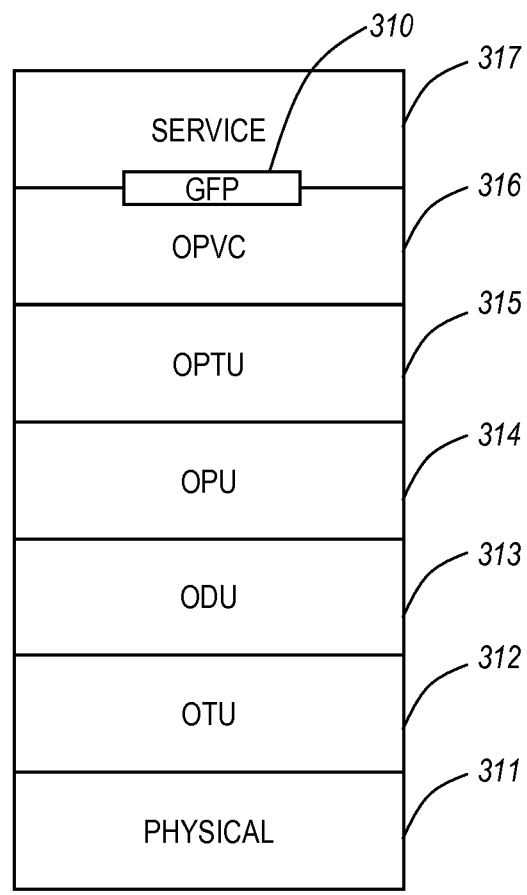
FIG. 3 is a logical diagram showing the OTN layers.

Referring to FIG. 3, in an exemplary embodiment, a logical diagram is illustrated showing the OTN layers. As described herein, OTN includes a set of ITU-T standards, such as ITU-T Recommendations G.709 and G.798, which are incorporated in-full by reference herein, defining a set of Optical Network Elements connected by optical fiber links, able to provide functionality of transport, multiplexing, routing, management, supervision and survivability of optical channels carrying client signals. In one exemplary embodiment, the present invention utilizes the OTN framework to support mesh restoration. A service layer 317 represents the end user service, such as Gigabit Ethernet (GbE), Synchronous Optical Network (SONET), Synchronous Digital Hierarchy (SDH), Fiber Channel (FC), Enterprise Systems Connection (ESCON) and the like. Asynchronous services, such as GbE, FC, ESCON, and the like, are passed through a Generic Frame Protocol (GFP) mapper 310. The GFP mapper 310 may be configured to adapt a wide variety of data signals to transport networks, and may be compliant with ITU-T Recommendation G.7041, which is incorporated in-full by reference herein. An Optical channel Payload Virtual Container (OPVC) 16 handles mapping the service from the service layer 17 to a uniform format. This is the only layer that needs to change to support a new service type. An Optical channel Payload Tributary Unit (OPTU) 15 maps the output of the OPVC 16 into a timeslot and performs timing adaptations to unify the clocking An Optical channel Payload Unit (OPU) 14 contains all of the timeslots in an OTN frame. An Optical channel Data Unit (ODU) 13 proves the path-level transport functions of the OPU 14. An Optical Transport Unit (OTU) 12 provides the section-level overhead for the ODU 13 and provides GCC0 bytes. Finally, a physical layer 11 maps the OTU 12 into a wavelength or a wavelength division multiplexing (WDM) system for transmission.

Figure 4:
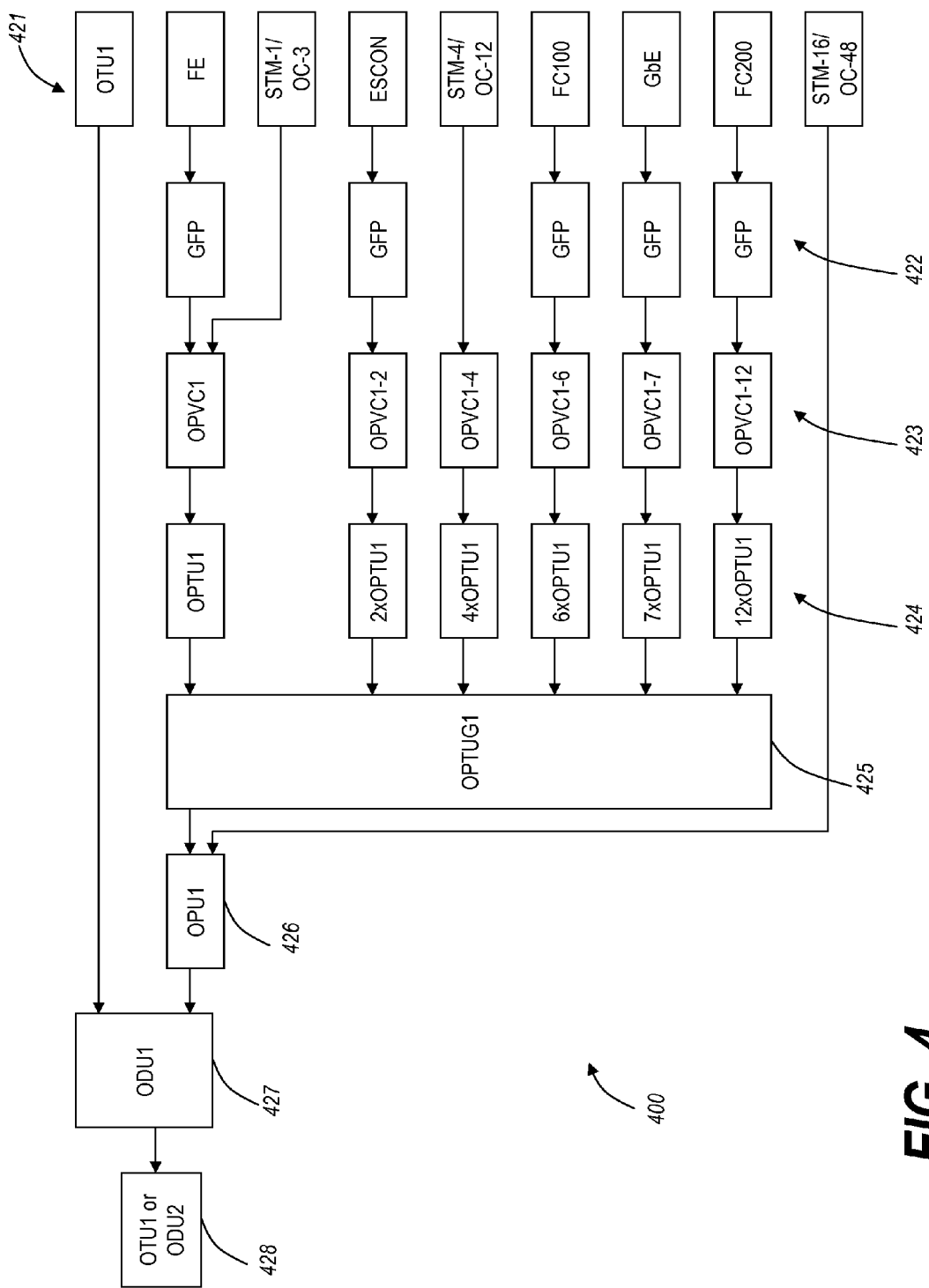
FIG. 4 is a mapping diagram of exemplary service mappings into the OTN framework.

Referring to FIG. 4, in an exemplary embodiment, a mapping diagram 400 illustrates exemplary service mappings into the OTN framework. Various services 421, such as STM-1/OC-3, Fast Ethernet (FE), OTU1, ESCON, STM-4/OC-12, Fiber Channel (FC100/FC200), GbE, STM-16/OC-48, and the like, are either mapped directly into OPVC 423 containers if synchronous or are first mapped with GFP 422 if asynchronous. As illustrated in diagram 400, different levels of OPVCs 423 are required for different services 421, and the OPVCs 423 are virtual containers which are concatenated to fit the services 421 bandwidth. For example, an STM-4 will require four OPVCs 423. Each OPVC 23 is able to contain up to 155 Mb/s. Next, the OPVCs 423 are mapped into OPTUs 424 where pointer processing is performed to adapt to node timing, and then they are multiplexed into OPTUG1 425. Then, the OPTUG1 425 is mapped into an OPU1 426, and also an STM-16/OC-48 421 service is directly mapped to the OPU1 426. After that, the OPU1 426 is mapped to an ODU1 427, and also an OTU1 421 service is directly mapped into the ODU1 427. Finally, the ODU1 is mapped to an OTU1 or ODU2 428.

Figure 5:
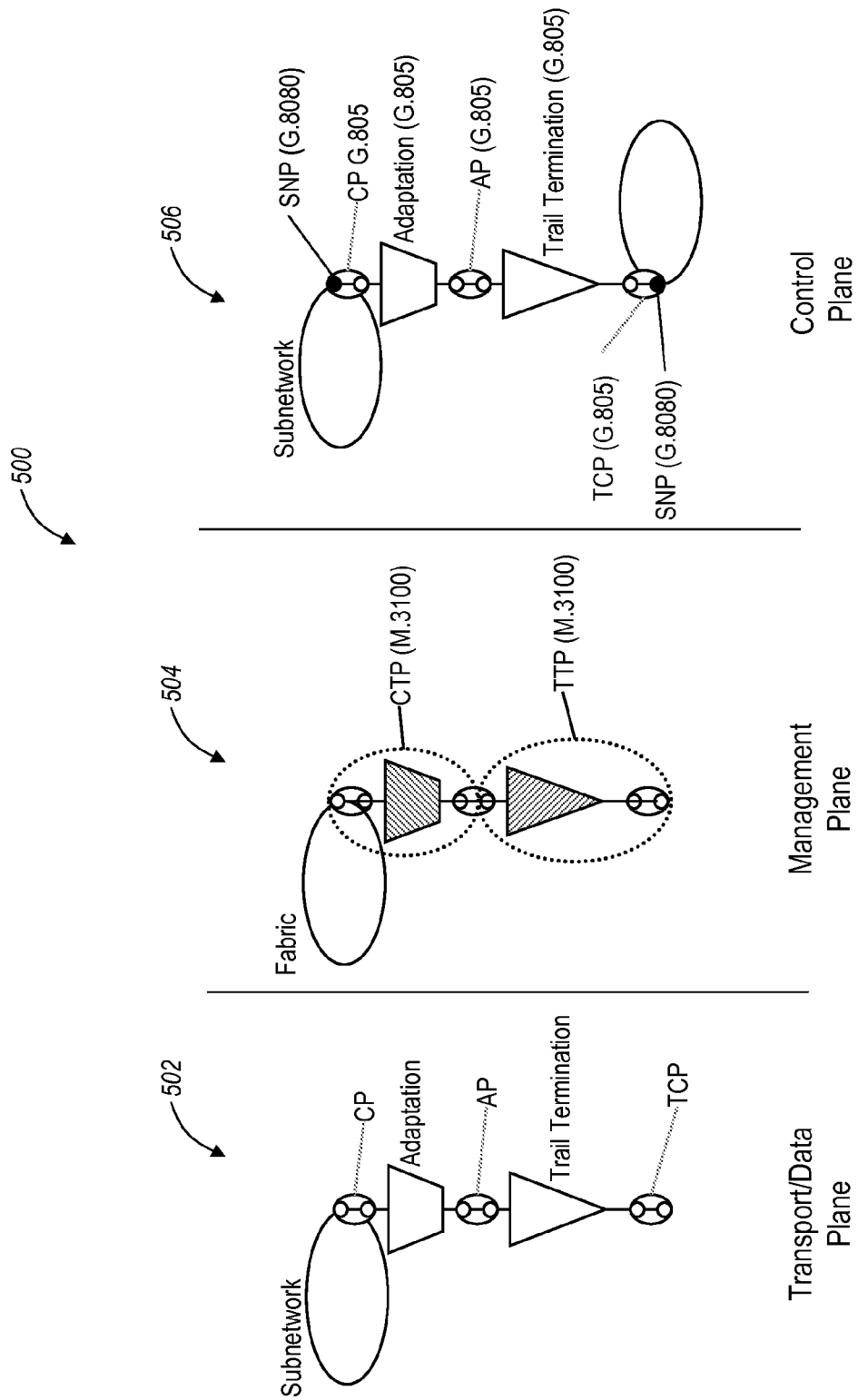
FIG. 5 is a logical diagram of a transport network architecture according to the present invention.

Referring to FIG. 5, in an exemplary embodiment, a logical diagram illustrates a transport network architecture 500 according to the present invention. The transport network architecture 500 includes three planes—a transport/data plane 502, a management plane 504, and a control plane 506. ITU-T M.3100 Recommendation "Generic network information model" (April 2005), which is incorporated in-full by reference herein, defines trail termination points (TTP), connection termination points (CTP), termination connection points (TCP), connection points (CP), etc. Importantly, M.3100 introduces a concept of technology-independent management to perform management of diverse equipment using common communication interfaces. As such, M.3100 provides an abstract view of a set of network elements. Annex J of M.3100 defines the trail termination point object class as used to represent a physical port or endpoints of transport connections. It may be used by technology-specific models as an abstraction of an underlying transport layer. The present invention relates to various functions/entities defined in ITU-T Recommendations G.805, "Generic functional architecture of transport networks," (March 2000); G.8080, "Architecture for the automatically switched optical network (ASON)," (June 2006); G.852.2, "Enterprise viewpoint description of transport network resource model", (March 1999); G.853.1, "Common elements of the information viewpoint for the management of a transport network," (March 1999); and G.7714, "Generalized automatic discovery for transport entities," (August 2005); the contents of each is incorporated in-full by reference herein. The server layer shows the trail termination function and the adaptation to the client layer. The client layer shows the termination connection point (TCP) and the connection point (CP). These functions are represented in a management information model (or management information base) as a trail termination point (TTP) and a connection termination point (CTP). The term subnetwork point may be used to represent either TTP or CTP. Further, the management and processing of TTPs, CTPs, etc. is performed through the common equipment 102 and/or the control modules 200, 202.

As illustrated in FIG. 5, the OTN transport network includes traffic at different hierarchical levels. For example, the hierarchy may include OTU-2→1*ODU-2→4*ODU-1–16*OPVC. Exemplary different trail termination points and the connection termination point that may be formed within the trail termination point are formulated in the table below:

| TTP | CTP | How Many |
|-----|-----|----------|
| OTU-2 | ODU-2 | 1 |
| ODU-2 | ODU-1 | 4 |
| ODU-1 | ODU-0 | 2 |
| ODU-1 | OPVC | 16 |

OPVC is a channelized ODU-1 which carries traffic at the rate of OC-3/STM-1 or OC-12/STM-3. To be able to create a circuit at a lower level of hierarchy, it requires the creation of all the trail termination points at the intermediate levels from the highest to the lowest+1 level. This is called the step-model (payload type 20). To be able to create these trail termination points at intermediate levels, there are two ways. These two different ways to provision the traffic patterns and setup circuits in OTN networks are using a static model and a dynamic model. The static model involves manual intervention while the dynamic does not and is automatic. In the static model configuration, a user has to manually create different levels of trail termination points, and without manually created levels of trail termination points, the routing subsystem cannot make use of this bandwidth even though it is available. In the dynamic model, when the routing subsystem wants to make use of the bandwidth is available, the trail termination points are automatically created from within the software so that the end to end circuit is created in the control plane 506 as well as in the transport/data plane 502. In an exemplary embodiment, the present invention is configured to create circuits, connections, etc. in data plane fast enough to meet mesh restoration standards. Further, the present invention may also support a mix of static versus dynamically provisioned trail termination points.

Figure 6:
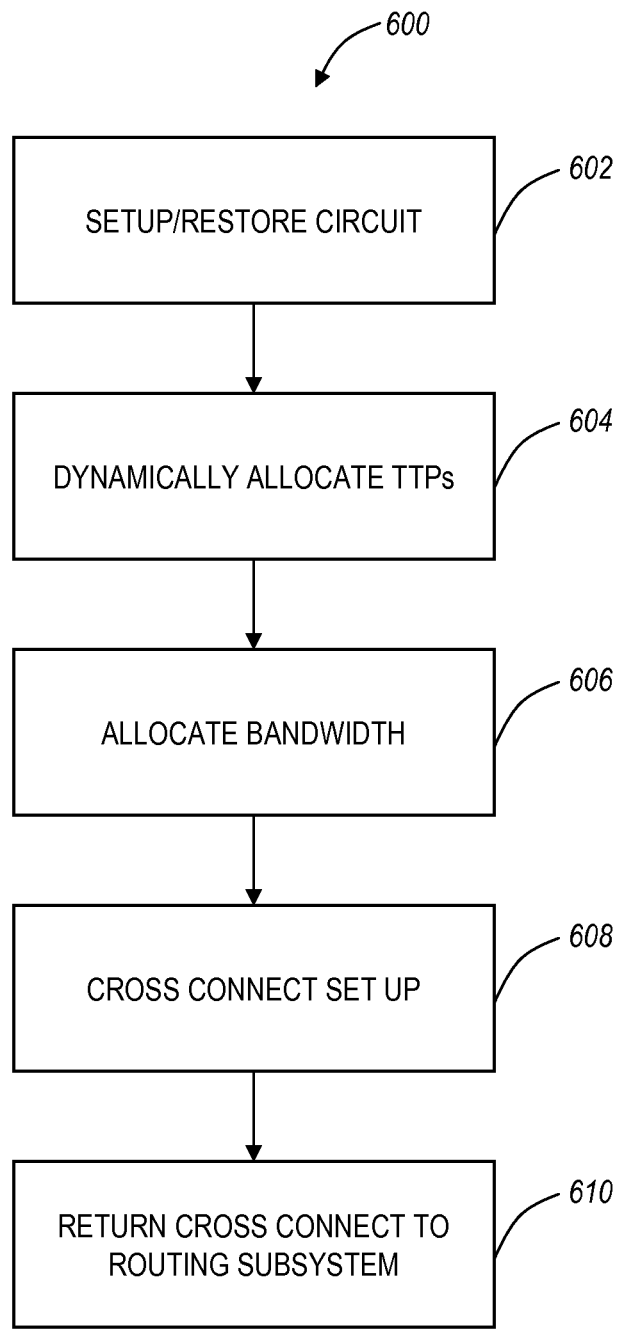
FIG. 6 is a flowchart of a routing method for dynamic trail termination point creation for OTN networks.

Referring to FIG. 6, in an exemplary embodiment, a flowchart illustrates a routing method 600 for dynamic trail termination point creation for OTN networks. The present invention provides dynamic trail termination point creation to carve out SONET/SDH/OTN bandwidth on demand. Specifically, there is a bandwidth manager (in an NE, control module, network management system, etc.) that maintains the bandwidth information available at each and every level. When the routing subsystem wants to setup or mesh restore a circuit (step 602), the bandwidth manager at all relevant nodes carves out, i.e. dynamically allocates, various different levels of trail termination points as required for the circuit (step 604). Subsequent, the bandwidth manager may make a decision for all relevant nodes on how to allocate bandwidth after carving out all the different levels of trail termination points (step 606). The bandwidth manager may then set up cross connects (XCON) based on the dynamically created trail termination points and the allocated bandwidth (step 608). Finally, the bandwidth manager may return the cross connects to the routing subsystem (step 610). With the method 600, the routing subsystem does not worry about how or where to carve out different trail termination points and what is the best method to do that in a way to avoid fragmentation etc. The crucial issue with this approach is that the bandwidth manager needs to deal with a situation where a circuit comes up in the control plane 506 but may come up later in the transport/data plane 502. To avoid this issue, a state machine is brought in which distinguishes between the control plane 506 (slow path) versus the transport/data plane 502 (fast path) so that the traffic comes up or mesh restores in the transport/data plane 502 as quickly as possible.

Figure 7:
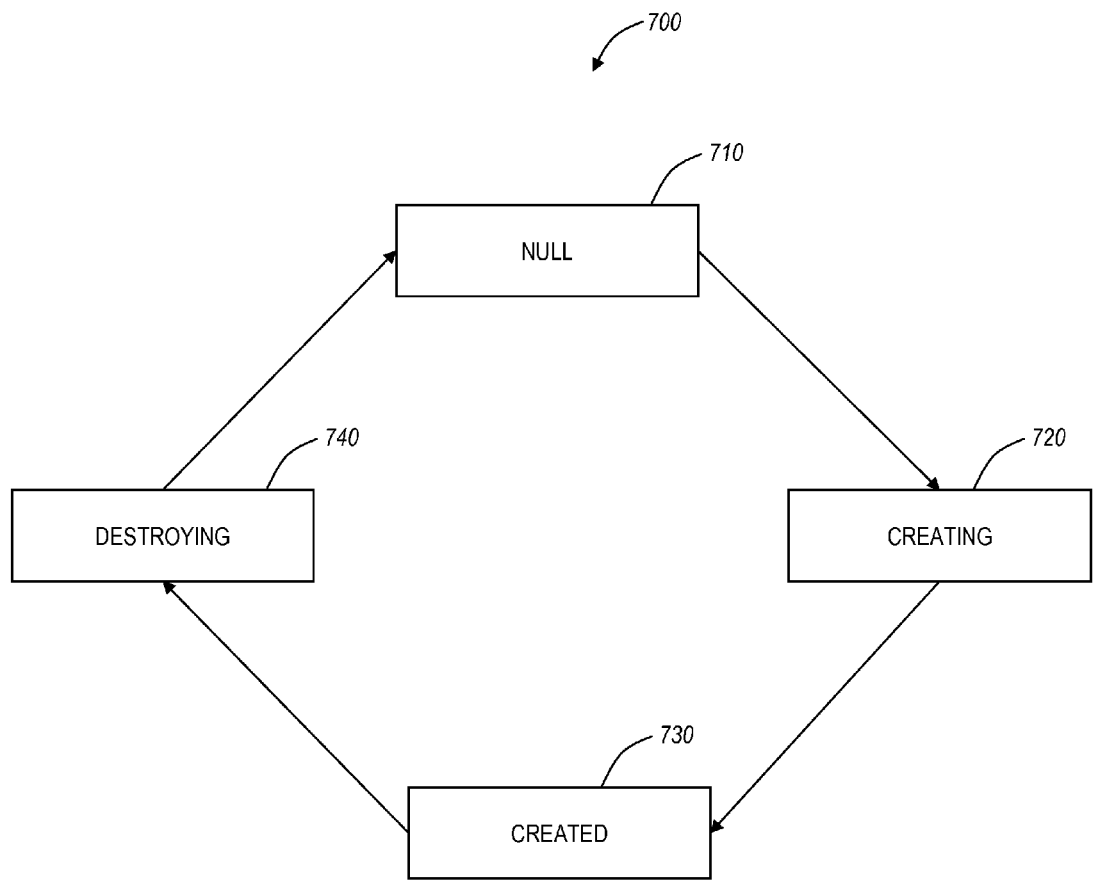
FIG. 7 is a state machine diagram of slow path and fast path behavior of trail termination points.

Referring to FIG. 7, in an exemplary embodiment, a state machine 700 illustrates slow path and fast path behavior of trail termination points. As described herein, circuits need to come up or restore in the transport/data plane 502 as quickly as possible. With the circuits being setup or torn down and re-setup and with the trail termination points being created and deleted one after the other and at different levels, it is possible that different sub-systems might have registered with or might have delegated responsibility to these trail termination point objects and/or the services that depend upon them. Thus, when a create request comes in for a trail termination point that has just been deleted but has references to it (either because of delegation activities or registration activities), this new trail termination point cannot be created at that time. Thus, the traffic will not come up in the transport/data plane 502 even though it came up on control plane 506. The present invention utilizes the state machine 700 to avoid these issues thus providing the "fast paths" and the "slow paths." With the state machine 700, the bandwidth manager is able to choose the right set of ports to allocate and route traffic.

The state machine 700 includes four states: a null state 710, a creating state 720, a created state 730, and a destroying state 740. The null state 710 is an initial state where the trail termination point does not exist in either the control plane 506 or the transport/data plane 502. The creating state 720 is when the trail termination point exists in the transport/data plane 502 and is being created in the control plane 506. The created state 730 is when the trail termination point exists in both the transport/data plane 502 and the control plane 506. The destroying state 740 is when the trail termination point is no longer in use by the transport/data plane 502 and is being removed from the control plane 506. The present invention utilizes these four states 710, 720, 730, 740 to represent dynamically created trail termination points. For example, assume each trail termination point is represented in a node, NE, switch, etc. as a logical entity, e.g. referred to as a CacLine. Initially, the CacLine starts off in the null state 710. A fast path create message may be sent thereby creating a CacLine equivalent in transport/data plane 502 and bringing up traffic, i.e. the creating state 720. When the response comes in saying the trail termination point got created in the control plane 506 also through the slow database, the state machine moves onto the created state 730.

Now this CacLine is not deleted unless the last circuit on it is removed. Even then, the CacLine cannot be deleted immediately since there may be another circuit that is just waiting to come up on it, i.e. do not want to delete this and re-create it thus wasting restoration time. Hence, the state machine 700 starts off a "HoldOff Timer" and only when it expires and if no circuit is on this CacLine(TTP), then a slow path delete request is sent out on the control plane 506. The "HoldOff Timer" may include a user-provisioned, predetermined, or system determined time to wait until destroying the dynamically created trail termination points. This is when the state machine 700 enters into the destroying state 740. Note that there is no such "Fast Path Delete". When the slow path delete goes to the line modules, the trail termination points are deleted in both transport/data plane 502 as well as the control plane 506 and the response comes back to the state machine 700. This is when the CacLine (TTP) is deleted and all cleanup activities take place.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An optical node, comprising:
a plurality of ports operating links according to Optical Transport Network (OTN); and
a control module in communication with each of the plurality of ports, wherein the control module operates a signaling and routing protocol;
wherein the control module is configured to dynamically manage OTN trail termination points; and
wherein the control module is configured to manage the OTN trail termination points via both a fast path utilizing a data/transport plane for provisioning the OTN trail termination points in the data/transport plane and a slow path utilizing a control plane for managing the OTN trail termination points in the control plane.

2. The optical node of claim 1, wherein the OTN trail termination points comprise any of ODU3 trail termination points, ODU2 trail termination points, and ODU1 trail termination points, and wherein each of the OTN trail termination points support different service models comprising any of ODU2, ODU1 and ODU0/OPVC.

3. The optical node of claim 1, further comprising:
the control plane;
the data/transport plane; and
a state machine for each of the OTN trail termination points, wherein the state machine determines activity associated with the OTN trail termination points relative to the control plane and the data/transport plane.

4. The optical node of claim 3, wherein the state machine comprises four states based upon each of the OTN trail termination points state in the control plane and the data/transport plane.

5. The optical node of claim 4, wherein one of the four states comprises a hold off timer to hold a time period prior to deleting a OTN trail termination point.

6. The optical node of claim 4, wherein responsive to a network failure, a OTN trail termination point is dynamically created via the slow path in the control plane and via the fast path in the data/transport plane.

7. The optical node of claim 1, wherein the signaling and routing protocol comprises one of Optical Signaling and Routing Protocol (OSRP), Automatically Switched Optical Network (ASON), and Generalized Multi Protocol Label Switching (GMPLS).

8. The optical node of claim 1, wherein the control module is configured to advertise bandwidth comprising any of Optical Channel Data Unit n, where n = 0, 1, 2, 3, and Optical channel Payload Virtual Containers.

9. The optical node of claim 1, wherein the signaling and routing protocol communicates to the other optical nodes via any of the General Communication Channels (GCC) in the OTN overhead comprising GCC0, GCC1, GCC2 or GCC1+2, an optical service channel, or an out-of-band connection.

10. An optical method, comprising:
via a bandwidth manager, maintaining bandwidth information at a various Optical Transport Network (OTN) levels;
receiving a circuit request;
dynamically allocating various different levels of OTN trail termination points responsive to the circuit request; and
creating an OTN trail termination point via a fast path in the data/transport plane for provisioning the OTN trail termination points in the data/transport plane and via a slow path in the control plane for managing the OTN trail termination points in the control plane.

11. The optical method of claim 10, further comprising:
setting up cross connections based on the dynamically created OTN trail termination points;
allocating bandwidth; and
returning the cross connects to a routing subsystem.

12. The optical method of claim 10, further comprising:
implementing a state machine to distinguish the OTN trail termination points between the control plane and the data/transport plane.

13. The optical method of claim 12, further comprising:
implementing a hold off timer prior to deleting the OTN trail termination point; and
if no circuits are added to the OTN trail termination point prior to expiration of the hold off timer, deleting the OTN trail termination point via the slow path in both the data/transport plane and the control plane.

14. The optical method of claim 13, wherein the OTN trail termination points comprise any of ODU3 trail termination points, ODU2 trail termination points, and ODU1 trail termination points, and wherein each of the OTN trail termination points support different service models comprising any of ODU2, ODU1 and ODU0/OPVC.

15. An optical network, comprising:
a plurality of interconnected nodes utilizing Optical Transport Network (OTN) links for the interconnection; and
a signaling and routing protocol operating on the plurality of interconnected nodes over the OTN links for maintaining network topology and bandwidth and for establishing Sub Network Connections (SNCs) between any of the plurality of interconnected nodes;
wherein each of the plurality of interconnected nodes is configured to dynamically manage OTN trail termination points, and wherein the OTN trail termination points comprise any of ODU3 trail termination points, ODU2 trail termination points, and ODU1 trail termination points, and wherein each of the OTN trail termination points support different service models comprising any of ODU2, ODU1 and ODU0/OPVC; and
wherein the OTN trail termination points are distinguished between a control plane in which the OTN trail termination points are managed via a slow path and a data/transport plane in which the OTN trail termination points are provisioned via a fast path.

16. The optical network of claim 15, further comprising:
one or more databases associated with the signaling and routing protocol for maintaining topology and bandwidth of the network; and
path computation logic associated with the signaling and routing protocol to provide routes through the network based on the one or more databases.

17. The optical network of claim 15, further comprising:
a state machine operated at each of the plurality of interconnected nodes for each of the dynamically managed OTN trail termination points, wherein the state machine state machine distinguishes the OTN trail termination points between the control plane and the data/transport plane.

18. The optical network of claim 17, wherein each of the plurality of interconnected nodes based upon the state machine is configured to:

create the OTN trail termination point via the fast path in the data/transport plane and via the slow path in the control plane;
implement a hold off timer prior to deleting the OTN trail termination point; and
if no circuits are added to the OTN trail termination point prior to expiration of the hold off timer, delete the OTN trail termination point via the slow path in both the data/transport plane and the control plane.

* * * * *